United States Patent
Freedman et al.

(10) Patent No.: US 12,540,636 B2
(45) Date of Patent: Feb. 3, 2026

(54) PIPE SUPPORT SYSTEMS AND METHODS

(71) Applicant: Universal City Studios LLC, Universal City, CA (US)

(72) Inventors: Daniel Matthew Freedman, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/620,803

(22) Filed: Mar. 28, 2024

(65) Prior Publication Data

US 2025/0305528 A1    Oct. 2, 2025

(51) Int. Cl.
*E04C 3/36* (2006.01)
*F16B 9/00* (2006.01)

(52) U.S. Cl.
CPC .................... *F16B 9/054* (2018.08)

(58) Field of Classification Search
CPC ..................................... F16B 9/054
See application file for complete search history.

(56) References Cited

U.S. PATENT DOCUMENTS

| | | | |
|---|---|---|---|
| 7,487,576 B2 | 2/2009 | Baratta et al. | |
| 8,974,217 B2 | 3/2015 | Everhart et al. | |
| 9,366,365 B2 | 6/2016 | Gauckler et al. | |
| 9,970,326 B2 * | 5/2018 | Roberts | F01D 5/005 |
| 11,345,064 B2 | 5/2022 | Santoni et al. | |
| 2004/0231789 A1 | 11/2004 | Blackmore et al. | |
| 2006/0174549 A1 | 8/2006 | Dagher et al. | |
| 2007/0175577 A1 * | 8/2007 | Dagher | B29C 70/446 |
| | | | 425/389 |
| 2015/0063942 A1 | 3/2015 | Auer | |
| 2024/0417218 A1 * | 12/2024 | Glasgow | B66B 9/0815 |

FOREIGN PATENT DOCUMENTS

| | | | | |
|---|---|---|---|---|
| WO | 2018053101 A1 | 3/2018 | | |
| WO | WO-2024047312 A1 * | 3/2024 | | B29C 33/52 |

OTHER PUBLICATIONS

English translation of WO-2024047312-A1 (Year: 2024).*
PCT/US2025/017625 International Search Report and Written Opinion mailed May 30, 2025.

* cited by examiner

*Primary Examiner* — Jun S Yoo
(74) *Attorney, Agent, or Firm* — Fletcher Yoder, P.C.

(57) ABSTRACT

A support system includes a hollow structural member and a bladder. The bladder includes a membrane that encloses an internal volume and a spout with at least one inlet to enable a compound to fill the internal volume to extend across an interior space of the hollow structural member to provide support to the hollow structural member.

17 Claims, 6 Drawing Sheets

PIPE SUPPORT SYSTEMS AND METHODS

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be understood that these statements are to be read in this light and not as admissions of prior art.

Certain structures are formed by fastening multiple components to one another. For example, a building frame may be formed by coupling multiple beams to one another. As another example, a vehicle frame may be formed by coupling multiple beams to one another. In certain applications, such as in the building frame, the multiple beams may be solid to provide a heavy structure. In other applications, such as in the vehicle, the multiple beams may be hollow to provide a lightweight structure.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a support system includes a hollow structural member and a bladder. The bladder includes a membrane that encloses an internal volume and a spout with at least one inlet to enable a compound to fill the internal volume to extend across an interior space of the hollow structural member to provide support to the hollow structural member.

In an embodiment, a method of operating a support system includes providing a compound to an internal volume enclosed by a membrane that is positioned in an interior space of a hollow structural member. The method also includes enabling the compound to set or cure within the membrane to form a solid support across the interior space of the hollow structural membrane.

In an embodiment, a method of operating a support system includes setting a compound within a bladder positioned in an interior space of a hollow structural member to form a solid support across the hollow structural member. The method also includes inserting a fastener through an opening formed in a wall that defines the interior space of the hollow structural member and into the solid support to couple the hollow structural member to another structural member.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Certain structures are formed by tightening a fastener (e.g., a threaded fastener, such as a bolt or a screw) to a hollow structural member (e.g., pipe, tube). The hollow structural member may be lightweight and may be desirable in certain contexts, such as at least in certain portions of vehicles, buildings, bridges, show sets, stage sets, ride vehicles, ride tracks, display frames, portable devices, portable props, and so forth. Without embodiments disclosed herein, tightening the fastener to the hollow structural member may compress and deform the hollow structural member.

Accordingly, embodiments disclosed herein relate to a structural support system that provides a solid support for a hollow structural member. In particular, the structural support system provides the solid support in an interior space of the hollow structural member. In an embodiment, a hole is formed in a wall of the hollow structural member, and a bladder is inserted into the interior space of the hollow structural member via the hole. Then, the bladder is filled with a compound that sets to form the solid support. The compound may be a fluid, gel, cement, resin, or any other suitable compound. Then, a fastener may be inserted into the hole and may also extend into the solid support to couple the hollow structural member to another structural member, which may be a solid beam, a plate, or another hollow structural member, for example. As described herein the structural support system may include additional or alternative features.

Figure 1:
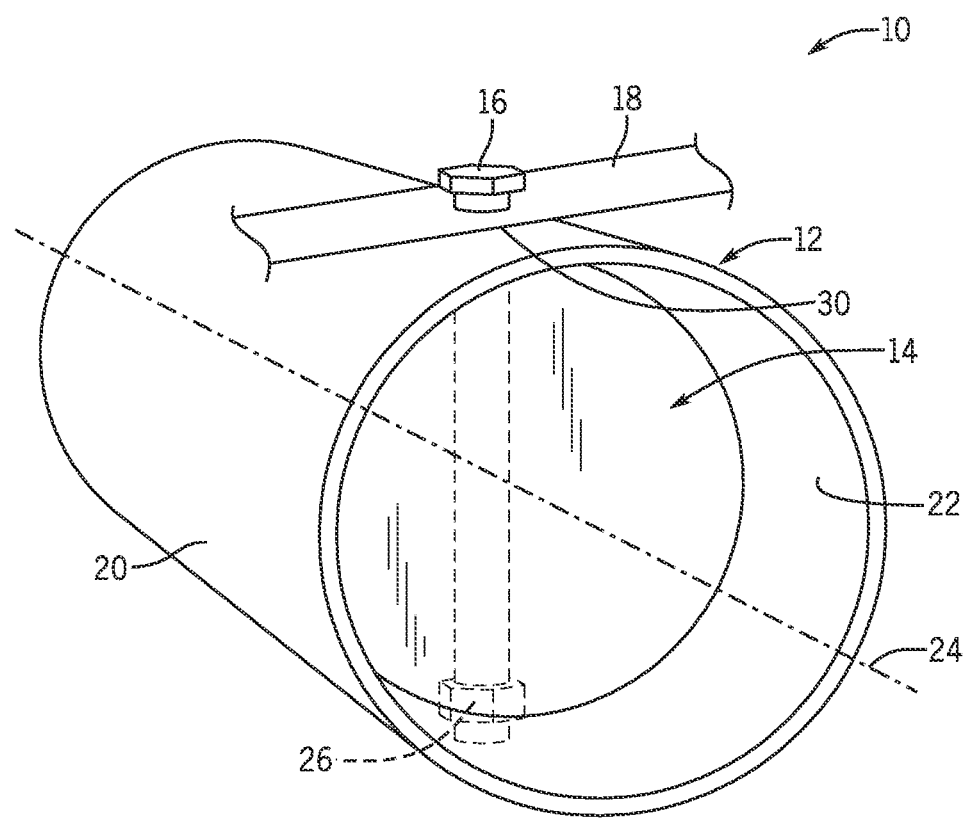
FIG. 1 is a perspective view of a portion of a structure that includes a hollow structural member with a solid support, in accordance with an embodiment of the present disclosure.

FIG. 1 is a perspective view of an embodiment of a portion of a structure 10 that includes a hollow structural member 12 with a solid support 14. As shown, a fastener 16 is provided to couple an additional structural member 18 to the hollow structural member 12. In an embodiment, the fastener 16 also extends into the solid support 14.

It should be appreciated that the structure 10 may be at least a portion of a vehicle, building, bridge, show set, stage set, ride vehicle, ride track, display frame, portable device, portable prop, or any other suitable structure. The hollow structural member 12 is an annular structure, such as a pipe or tube. In particular, the hollow structural member 12 may include a wall 20 (e.g., side wall; annular wall) that defines and/or circumferentially surrounds an interior space 22 (e.g., center bore, passage, channel) with a center axis 24. The hollow structural member 12 is a substantially rigid member that may be made from metal (e.g., metal, metal alloy), concrete, or any other suitable material. While the hollow structural member 12 and the interior space 22 are depicted as having a circular cross-sectional shape (e.g., taken in a plane perpendicular to the center axis 24) in FIG. 1, it should be appreciated that the hollow structural member 12 and the interior space 22 may have any suitable cross-sectional shape, such as a square or rectangular cross-sectional shape, for example.

The solid support 14 may be formed via a compound, such as a gel, cement, resin, or other suitable compound that is configured to transition from a flowable material to a solid material. For example and as described in more detail herein, the compound may be inserted into a bladder positioned in the interior space 22, and the compound sets or cures to form the solid support 14 within the interior space 22. The fastener 16 may be any suitable type of fastener, such as a threaded fastener, such as a bolt or a screw. The fastener 16 may be a rigid fastener that may be made from metal (e.g., metal, metal alloy) or any other suitable material. The additional structural member 18 may be a solid beam, a plate, another hollow structural member, or any other suitable structural member. The additional structural member 18 may be a rigid or flexible member that may be made from metal (e.g., metal, metal alloy), concrete, polymer, plastic, or any other suitable material.

The solid support 14 may provide support to the wall 20 from within the interior space 22 of the hollow structural member 12, which may block deformation of the wall 20. For example, the solid support 14 may block deformation of the wall 20 due to tightening the fastener 16 to couple to the hollow structural member 12 to the additional structural member 18. In an embodiment, the solid support 14 may also receive or engage the fastener 16, and thus may also provide support to the fastener 16. As described in more detail herein, various techniques may be implemented to provide the solid support 14 within the interior space 22 of the hollow structural member 12.

Figure 2:
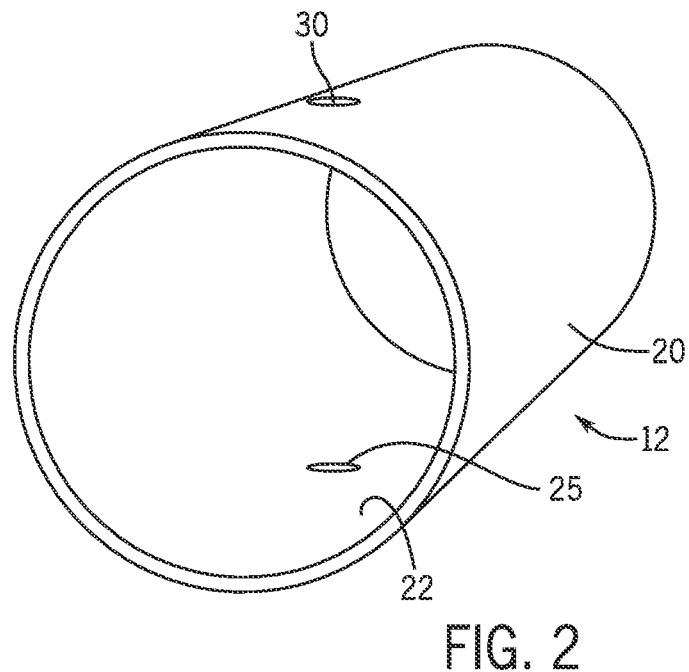
FIG. 2 is a perspective view of the hollow structural member of FIG. 1, in accordance with an embodiment of the present disclosure.

FIGS. 2-6 illustrate the hollow structural member 12 as it progresses through a series of steps to provide the solid support 14 within the interior space 22 of the hollow structural member 12. In particular, FIG. 2 is a perspective view of an embodiment of the hollow structural member 12 prior to installation of the solid support 14 of FIG. 1. As shown, the hollow structural member 12 includes the wall 20 that defines the interior space 22, and a hole 30 is formed through the wall 20. For example, the hole 30 may be formed via drilling through the wall 20. It should be appreciated that the hole 30 may be formed via any suitable technique at any suitable time, such as during manufacture of the hollow structural member 12, during assembly of the structure of FIG. 1, during repair or maintenance of the structure of FIG. 1, at a manufacturing or assembly facility, and/or at a final site or location for the structure 10 of FIG. 1. The hole 30 may be formed with or without threads (e.g., along an annular surface that defines the hole 30). For example, the hole 30 may have the threads to threadably couple to the fastener 16 of FIG. 1.

Figure 3:
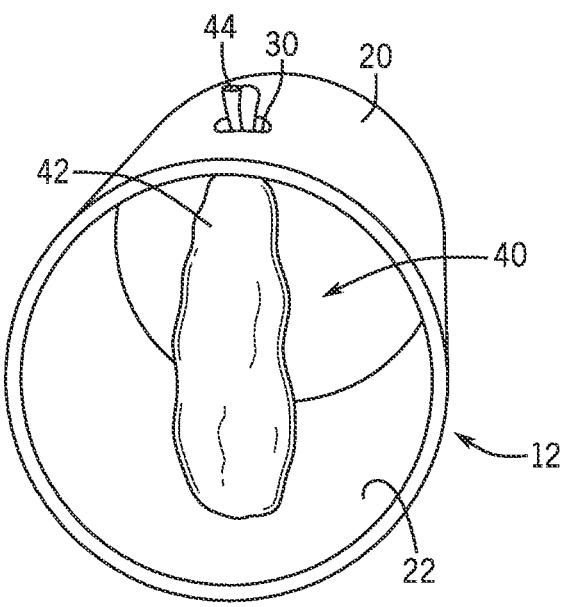
FIG. 3 is a perspective view of the hollow structural member of FIG. 1 with a bladder positioned in an interior space of the hollow structural member, wherein the bladder is in a deflated configuration, in accordance with an embodiment of the present disclosure.

FIG. 3 is a front perspective view of an embodiment of the hollow structural member 12 with a bladder 40 positioned in the interior space 22 of the hollow structural member 12. Once the hole 30 is formed through the wall 20 of the hollow structural member 12, as shown in FIG. 2, at least a portion of the bladder 40 may be inserted into the interior space 22 of the hollow structural member 12 via the hole 30. The bladder 40 may be an enclosure and may have an internal volume enclosed by a membrane 42. The membrane 42 may be resilient (e.g., elastic, flexible), such that a volume and/or shape of the bladder 40 changes depending on an internal pressure therein. For example, the bladder 40 may be in a deflated configuration when the internal pressure is less than an external pressure, and the bladder 40 may adjust (e.g., transition, expand) to an inflated configuration when the internal pressure is greater than the external pressure. The membrane 42 may be formed from polymer, plastic, or any other suitable material. In operation, the bladder 40 may be inserted into the interior space 22 of the hollow structural member 12 via the hole 30 while the bladder 40 is in the deflated configuration. The bladder 40 may include a spout portion 44 that forms or provides at least one opening (e.g., channel; path) into the internal volume enclosed by the membrane 42.

Figure 4:
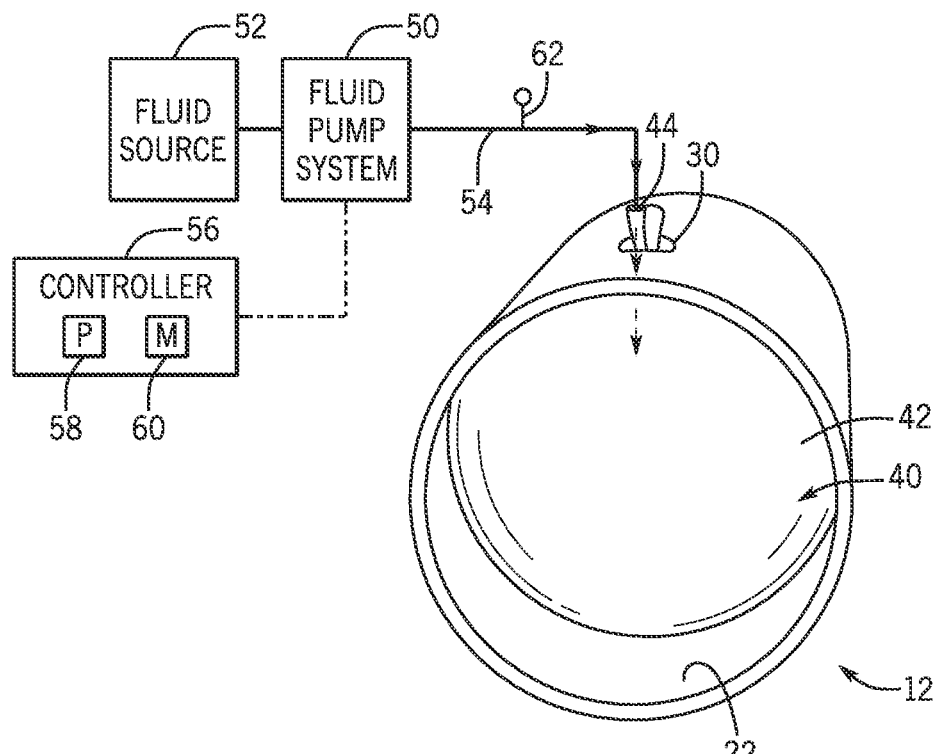
FIG. 4 is a perspective view of the hollow structural member of FIG. 1 with the bladder, wherein the bladder is in an inflated configuration, in accordance with an embodiment of the present disclosure.

FIG. 4 is a perspective view of an embodiment of the hollow structural member 12 with the bladder 40, wherein the bladder 40 positioned in the interior space 22 of the hollow structural member 12 is in the inflated configuration. In an embodiment, after the bladder 40 is inserted through the hole 30, a fluid may be provided through the spout portion 44 to the internal volume enclosed by the membrane 42. For example, a fluid pump system 50 may pump or otherwise enable flow of the fluid from a fluid source 52 through the spout portion 44 to the internal volume enclosed by the membrane 42. The fluid may be a gas, such as air or any other suitable gas. The fluid may be provided to the internal volume enclosed by the membrane 42 for various purposes, such as to provide information about dimensions of the interior space 22 of the hollow structural member 12. As described in detail herein, the information about the dimensions of the interior space 22 of the hollow structural member 12 may inform additional operations related to providing the compound to form the solid support 14 of FIG. 1.

The fluid pump system 50 may include a pump to turn on and off to selectively pump the fluid toward the spout portion 44 and/or a valve to open and close to selectively enable flow of the fluid across the valve toward the spout portion 44. The fluid pump system 50 may be operated via inputs from an operator (e.g., a human operator), such as via the operator actuating keys, switches, and so forth to turn on and off the pump and/or to open and close the valve. In some cases, the fluid pump system 50 may be operated via the inputs from the operator to turn on the pump and/or open the valve, while automatic shut off (e.g., without the inputs from the operator) is provided to automatically turn off the pump and/or to automatically close the valve under certain conditions, such as in response to high pressure along a fluid line 54 that extends between the fluid source 52 and the spout portion 44.

For example, a controller 56 (e.g., electronic controller) with a processor 58 and a memory device 60 may be provided to electronically control the fluid pump system 50. The controller 56 may be communicatively coupled to one or more sensors 62, which may be incorporated into the fluid pump system 50, located at the fluid source 52, and/or exposed to fluid in the fluid line 54, for example. The one or more sensors 62 may include one or more pressure sensors that generate sensor data indicative of pressure along the fluid line 54 and/or one or more flow rate sensors that generate sensor data indicative of volumetric flow rate to the bladder 40. It should be appreciated that the one or more sensors 62 may include any suitable type of sensor at any suitable location to facilitate techniques disclosed herein.

In response to the sensor data indicating the high pressure condition along the fluid line 54 (e.g., meeting or exceeding a pressure threshold), the controller 56 may provide a control signal to the fluid pump system 50 to carry out the automatic shut off. The pressure threshold may correspond to or occur when the membrane 42 contacts the wall 20 of the hollow structural member 12 (e.g., inflates to contact the wall 20 of the hollow structural member 12 and/or to fill a cross-section of the hollow structural member 12, wherein the cross-section is taken through or perpendicular to the center axis 24 of FIG. 1). Based on the volumetric flow rate, the controller 56 may also determine a volume of fluid provided to the internal volume enclosed by the membrane 42 that resulted in or produced the high pressure along the fluid line 54. Thus, the controller 56 may determine or approximate the internal volume of the interior space 22 of the hollow structural member 12.

Figure 5:
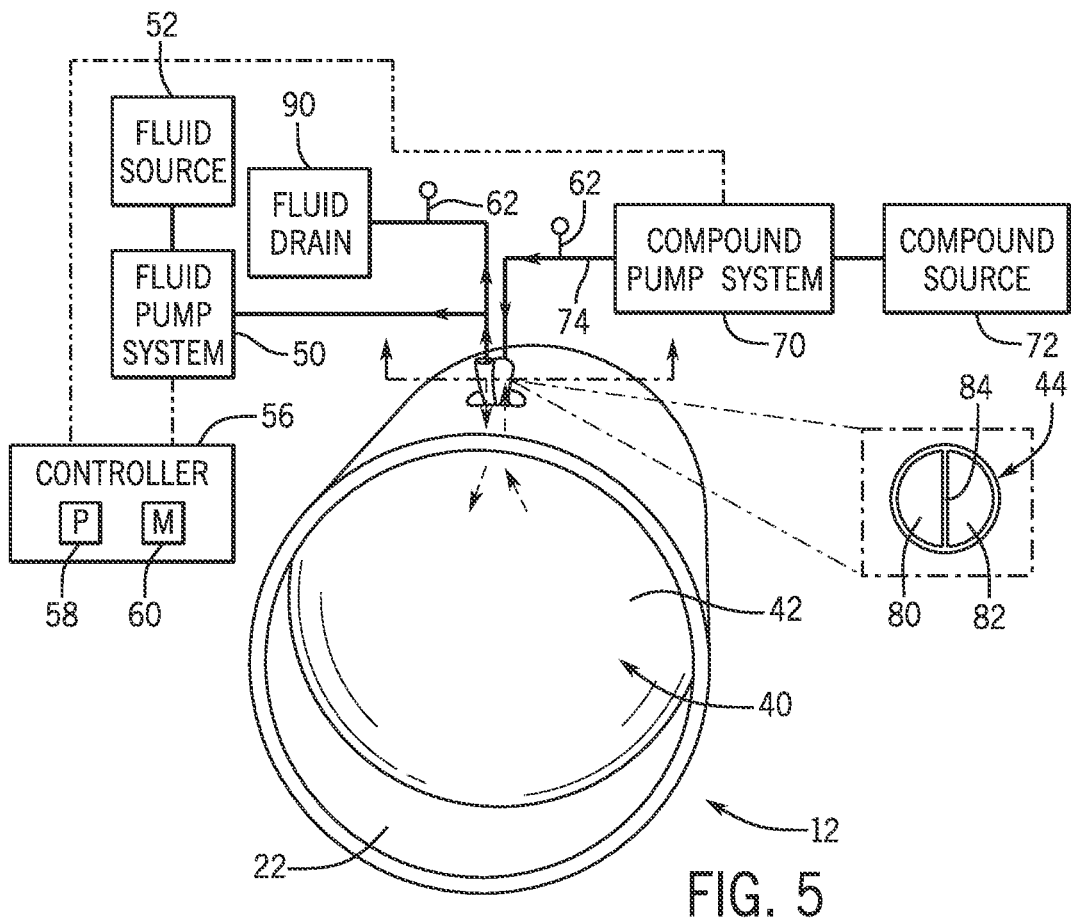
FIG. 5 is a perspective view of the hollow structural member of FIG. 1 with the bladder, wherein the bladder positioned in the interior space of the hollow structural member is filled with a compound, in accordance with an embodiment of the present disclosure.

FIG. 5 is a perspective view of an embodiment of the hollow structural member 12 with the bladder 40, wherein the bladder 40 positioned in the interior space 22 of the hollow structural member 12 is filled with a compound. In an embodiment, after the bladder 40 is filled with the fluid (e.g., gas, such as air) to contact the wall 20 of the hollow structural member 12 (e.g., filled with the fluid from the fluid source 52 via the fluid pump system 50), the compound may be provided through the spout portion 44 to the internal volume enclosed by the membrane 42. For example, a compound pump system 70 may pump or otherwise enable flow of the compound from a compound source 72 through the spout portion 44 to the internal volume enclosed by the membrane 42. For example, the compound pump system 70 may include a mechanical or electrical pump, or a syringe (e.g., a handheld syringe) that dispenses or releases the compound when operated (e.g., compressed). The compound may be a fluid, gel, cement, resin, or any other suitable compound that sets/cures to form the solid support 14 of FIG. 1.

A volume (e.g., a target volume; an appropriate volume) of the compound to provide to the internal volume enclosed by the membrane 42 may be determined based on or to correspond to the internal volume of the interior space 22 of the hollow structural member 12, as indicated by the volume of fluid provided to the internal volume enclosed by the membrane 42 that resulted in or produced the high pressure along the fluid line 54, as discussed with respect to FIG. 4. In this way, the controller 56 may provide control signals to the compound pump system 70 to pump or to otherwise provide the volume of the compound to the spout portion 44 (e.g., to turn the pump on and off at appropriate times to provide the volume of the compound to the spout portion 44).

In an embodiment, the spout portion 44 may include two openings (e.g., channels, flow paths). For example, as shown in an inset of FIG. 5 with a cross-sectional view taken across the spout portion 44, a first opening 80 at the spout portion 44 may provide an inlet/outlet for the fluid, while a second opening 82 at the spout portion 44 may provide an inlet for the compound. It should be appreciated that other configurations are envisioned, such as the first opening 80 may a dedicated inlet for both the fluid and the compound, while the second opening 82 may be a dedicated outlet for the fluid. In an embodiment, the first opening 80 and the second opening 82 may be separated by a divider 84, which may be a portion of the membrane 42 or other material positioned across the spout portion 44. In this way, the spout portion 44 provides two openings fluidly coupled to the internal volume enclosed by the membrane 42, such that the fluid may flow out of the internal volume enclosed by the membrane 42 as the compound flows into the internal volume enclosed by the membrane 42. This may provide efficient operations, as well as facilitate filling with the compound. For example, the fluid may maintain the bladder 40 in the inflated configuration during the filling with the compound, which may reduce folds in the membrane 42. As shown, the fluid may flow out of the internal volume enclosed by the membrane 42 to a fluid drain 90, although any suitable configuration is envisioned. For example, the first opening 80 may act as a vent to vent the fluid to atmosphere.

In an embodiment, the one or more sensors 62 may be utilized to monitor the volume of the compound provided to the spout portion 44 and/or to confirm that the volume of the compound is appropriate. The one or more sensors 62 may be incorporated into the compound pump system 70, located at the compound source 72, and/or exposed to fluid in a compound line 74, for example. For example, the controller 56 may process the sensor data to determine that the compound fills the membrane 42 and causes the membrane 42 to contact the wall 20 of the hollow structural member 12, or to confirm that the volume of the compound that fills the membrane 42 causes the membrane 42 to contact the wall 20 of the hollow structural member 12 as expected, when a pressure meets a target pressure. The one or more sensors 62 may include one or more pressure sensors that generate sensor data indicative of pressure along the compound line 74 and/or one or more flow rate sensors that generate sensor data indicative of volumetric flow rate to the bladder 40. It should be appreciated that the one or more sensors 62 may include any suitable type of sensor at any suitable location to facilitate techniques disclosed herein.

It should be appreciated that operations to fill the bladder 40 with the compound may be carried out in any of a variety of ways. For example, dimensions of the hollow structural member 12 may be known (e.g., according to manufacturing specifications; measured). In some such cases, the fluid may not be provided to the internal volume enclosed by the membrane 42. Instead, if the dimensions of the hollow structural member 12 are known, the bladder 40 may be selected based on the dimensions of the hollow structural member 12, such that the bladder 40 is capable of inflating to cause the membrane 42 to contact the wall 20 of the hollow structural member 12. Further, a volume of the compound that should be provided to the bladder 40 to cause the membrane 42 to contact the wall 20 of the hollow structural member 12 may be known or determined based on the dimensions of the hollow structural member 12 and characteristics of the bladder 40, such as a shape, size, material, material properties, and so forth of the bladder 40. That is, when the hollow structural member 12 has particular dimensions and the bladder 40 has particular characteristics, the volume of the compound that should be provided to the bladder 40 may be known or determined using one or more models, algorithms, and so forth.

Accordingly, in such cases, after the bladder 40 is inserted through the hole 30 that is formed through the wall 20 of the hollow structural member 12, the controller 56 may provide control signals to the compound pump system 70 to cause the volume of the compound to be provided through the spout portion 44 to the internal volume enclosed by the membrane 42, followed by the automatic shut off. Thus, the operations to fill the bladder 40 with the compound may be carried out without the step of providing the fluid to the internal volume enclosed by the membrane 42. In an embodiment, even if the dimensions of the hollow structural member 12 are known, the fluid may still be provided to the internal volume enclosed by the membrane 42 for other purposes, such as to confirm a capability of the bladder 40 to expand within the hollow structural member 12 and/or to transition the bladder 40 to the inflated configuration to prepare the bladder 40 for filling with the compound.

In any case, once the compound fills the internal volume enclosed by the membrane 42 and drives the membrane 42 against the wall 20 of the hollow structural member 12, the compound may set/cure within the membrane 42 and/or within the hollow structural member 12. For example, the compound may dry, harden, solidify, and/or cure over time to form the solid support 14 shown in FIG. 1. Thus, the compound may transition to the solid support 14 over a period of time, such as 0.5, 1, 2, 3, 4, 5, 10, or more minutes (e.g., to set), or possibly longer, such as 1, 2, 3, 4, or more hours (e.g., to fully cure). In an embodiment, an additional compound or component (e.g., catalyst) may be mixed with the compound prior to injection of the compound to the internal volume. In an embodiment, the additional compound or component may be provided separately to the internal volume to facilitate or cause the compound to transition to the solid support 14. For example, the additional compound or component may be provided to the internal volume via the first opening 80 and/or the second opening 82 of the spout portion 44 with the compound, after the compound, and/or after removal of the fluid.

In an embodiment, the membrane 42 may be configured to dissolve, such as due to exposure to one or more components present in the compound. For example, the one or more components may include water, chemicals, and so forth that are configured to dissolve a material of the membrane 42 due to contact with the material of the membrane 42. Thus, the one or more components may dissolve the material of the membrane 42 over a period of time, such as 0.5, 1, 2, 3, 4, 5, 10, or more minutes due to the contact with the material of the membrane 42. A time to dissolve the material of the membrane 42 may correspond to a time to transition the compound from a flowable material to the solid support 14, such that the membrane 42 provides the enclosure to contain the compound as the compound sets. In this way, a final shape of the solid support 14 may correspond to the internal volume enclosed by the membrane 42 and may fill or extend across the interior space 22 of the hollow structural member 12. In an embodiment, removal or dissolution of the membrane 42 in this way may facilitate bonding (e.g., chemical bonding) between the compound and an interior surface of the wall 20, which may help to retain the solid support 14 at a location within the hollow structural member 12 and provide additional support to the hollow structural member 12. In an embodiment, the one or more components may be provided separately to dissolve the material of the membrane 42. For example, the one or more components may be provided in a solution that is injected into the hole 30 at some time after the compound fills the internal volume enclosed by the membrane 42.

In an embodiment, the membrane 42 may be a semi-permeable membrane that enables some portion of the compound to travel or pass (e.g., permeate) across the membrane 42. In such cases, the compound may fill the internal volume enclosed by the membrane 42 and also some portion of the compound may pass across the membrane 42 to contact and bond to the interior surface of the wall 20, which may help to retain the solid support 14 at a location within the hollow structural member 12 and provide additional support to the hollow structural member 12.

With reference to FIGS. 1 and 2, the fastener 16 may then be inserted into the hole 30 formed in the wall 20 of the hollow structural member 12 to couple the additional structural member 18 to the hollow structural member 12. In an embodiment, the fastener 16 may be inserted after the compound sets/cure within the hollow structural member 12, and techniques for this may vary based on a material and characteristics (e.g., hardness) of the compound once it forms the solid support 14. For example, if the compound is a resin or cement, then an opening may be drilled into the resin or cement to enable insertion of the fastener 16. Further, in and embodiment, the fastener 16 may extend across the interior space and through an additional hole 25 formed in the wall 20 of the hollow structural member 12 opposite the hole 30, and a nut 26 may secure the fastener 16 in place. It should be appreciated that, in an embodiment, the fastener 16 may be inserted into the hole 30 as the compound sets within the hollow structural member 12. Accordingly, the compound may set about the fastener 16 to secure the fastener 16 within the hollow structural member 12 and to provide additional support to the fastener 16, as well as to the structure 10 more generally.

The memory device 60 may include volatile memory, such as random-access memory (RAM), and/or non-volatile memory, such as read-only memory (ROM), optical drives, hard disc drives, solid-state drives, or any other non-transitory computer-readable medium that includes instructions to operate the fluid pump system 50 and/or the compound pump system 70. The processor 58 may be configured to execute such instructions. For example, the processor 58 may include one or more application specific integrated circuits (ASICs), one or more field programmable gate arrays (FPGAs), one or more general-purpose processors, or any combination thereof. The memory device 60 may include one or more memory devices, and/or the processor 58 may include one or more processors. Accordingly, the controller 56 may refer to any configuration of one or more memory devices and/or one or more processors that operate together to carry out techniques disclosed herein. For example, the controller 56 may include processing circuitry with one processor to perform certain operations, another processor to perform other operations, and so forth. While certain examples disclosed herein include the controller 56 and certain automated steps, it should be appreciated that the operator may carry out installation of the solid support 14 via manual steps, such as via filling the bladder 40 with the fluid (e.g., via a human operator holding and manipulating an air pump), determining the volume of the fluid based on sensor data and/or based on visual observation (e.g. by the human operator), and then filling the bladder 40 with an appropriate volume of the compound that corresponds to the volume of the fluid (e.g., via the human operator holding and manipulating a syringe to dispense the fluid).

Figure 6:
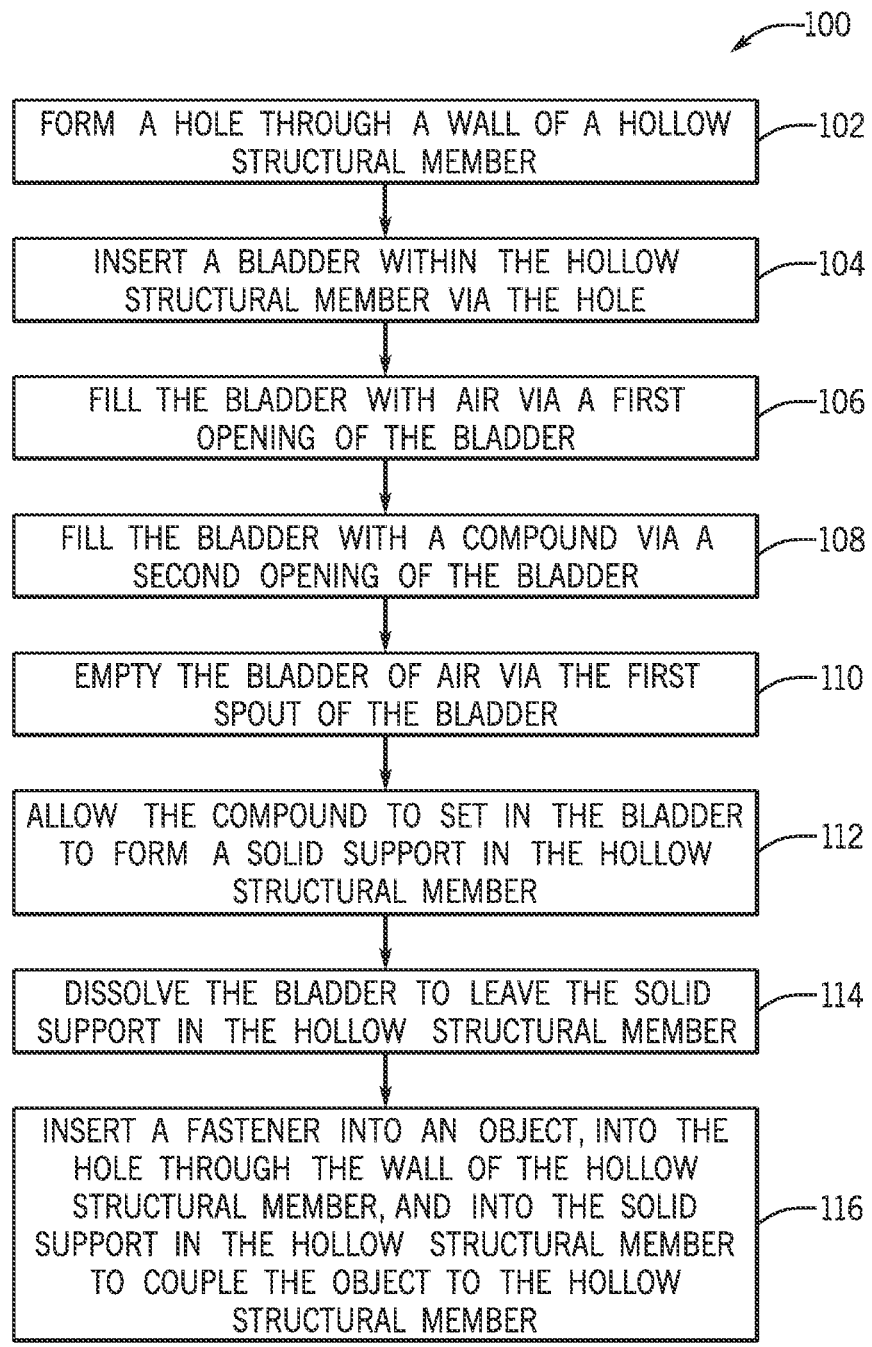
FIG. 6 is a flowchart of a method of operating a support system to provide a solid support for a hollow structural member, in accordance with an embodiment of the present disclosure.

FIG. 6 is a flow diagram of an embodiment of a method 100 of operating a support system to provide a solid support for a hollow structural member, such as the support system shown and described with reference to FIGS. 1-5. Any suitable device, such as the controller 56 of FIGS. 4 and 5, may perform some or all blocks of the method 100. As described herein, an operator may perform some or all blocks of the method 100. While the method 100 is described using blocks in a specific sequence, it should be understood that the present disclosure contemplates that the blocks may be performed in a different order, certain blocks may be omitted, and/or additional blocks may be added.

In block 102, the method 100 may be begin with forming a hole through a wall of a hollow structural member. For example, the hollow structural member may include the wall that defines an interior space, and the hole is formed through the wall. In an embodiment, the hole may be formed via drilling through the wall.

In block 104, the method 100 may continue with inserting a bladder into the hollow structural member via the hole. As described herein, the bladder may include an internal volume enclosed by a membrane, and the bladder may be configured to adjust between a deflated configuration and an inflated configuration. The bladder may be in the deflated configuration as it is inserted through the hole to enable the bladder to fit through the hole.

In block 106, the method 100 may continue with filling the bladder with a fluid, such as air. The bladder may include a spout portion, which may include a first opening that enables flow of the fluid into the internal volume enclosed by the membrane to thereby fill the bladder with the fluid. In block 108, the method 100 may continue with filling the bladder with a compound. The compound may be a gel, cement, resin, or other suitable compound that is configured to transition from a flowable material to a solid material under certain conditions, such exposure to heat and/or evaporation of solvents over time, exposure to an appropriate catalyst for a period of time, and so forth, and also to maintain properties (e.g., shape, strength) as the solid material. The bladder may include the spout portion, which may include a second opening that enables flow of the compound into the internal volume enclosed by the membrane to thereby fill the bladder with the compound. In block 110, the method 100 may continue with emptying the bladder of the fluid, such as via the first opening that enables flow of the fluid from the internal volume enclosed by the membrane to thereby empty the bladder of the fluid. It should be appreciated that blocks 108 and 110 may be carried out simultaneously (e.g., at a same time, at overlapping times), such that the fluid vents (e.g., flows out) from the bladder as the compound fills the bladder (e.g., the compound displaces the fluid).

As described herein, block 106 may enable determination of an internal volume of the interior space defined by the wall of the hollow structural member and/or an appropriate volume of the compound to provide to fill the bladder in block 108. However, the internal volume of the interior space defined by the wall of the hollow structural member may be known or alternative techniques to determine the appropriate volume of the compound to provide to fill the bladder in block 108 may be utilized. For example, a pressure in a fluid line that extends between a compound source and the bladder may be monitored, and the pressure may be utilized to determine that the appropriate volume of the compound has been provided to fill the bladder in block 108. In such cases, block 106 may be omitted, or block 106 may be carried out for other purposes (e.g., to inflate the bladder, but not to determine the appropriate volume of the compound to provide to fill the bladder in block 108).

In block 112, the method 100 may continue with allowing the compound to set in the bladder and in the hollow structural member to form a solid support in the hollow structural member. For example, the compound may dry, harden, solidify, and/or cure over time to form the solid support. In block 114, the method 100 may continue with dissolving the bladder, and specifically the membrane of the bladder, to leave the solid support in the hollow structural member. In an embodiment, a material of the membrane may be configured to dissolve due to exposure to one or more components, which may be present in the compound. For example, the one or more components may include water, chemicals, and so forth that are configured to dissolve the material of the membrane due to contact with the material of the membrane. Thus, the one or more components may dissolve the material of the membrane over a period of time due to the contact with the material of the membrane.

In block 116, the method 100 may continue with inserting a fastener into the hole formed in the wall of the hollow structural member to couple an additional structural member to the hollow structural member. The fastener may be inserted into the hole after the compound sets/cures within the hollow structural member, and further to extend across the hollow structural member and through an additional hole opposite the hole (e.g., formed via drilling). In an embodiment, the fastener may be inserted into the hole as the compound sets within the hollow structural member. Accordingly, the compound may set about the fastener to secure the fastener within the hollow structural member and to provide additional support to the fastener, as well as to a structure formed by the hollow tubular structure. It should be appreciated that the fastener may be inserted after the compound sets within the hollow structural member.

Figure 7:
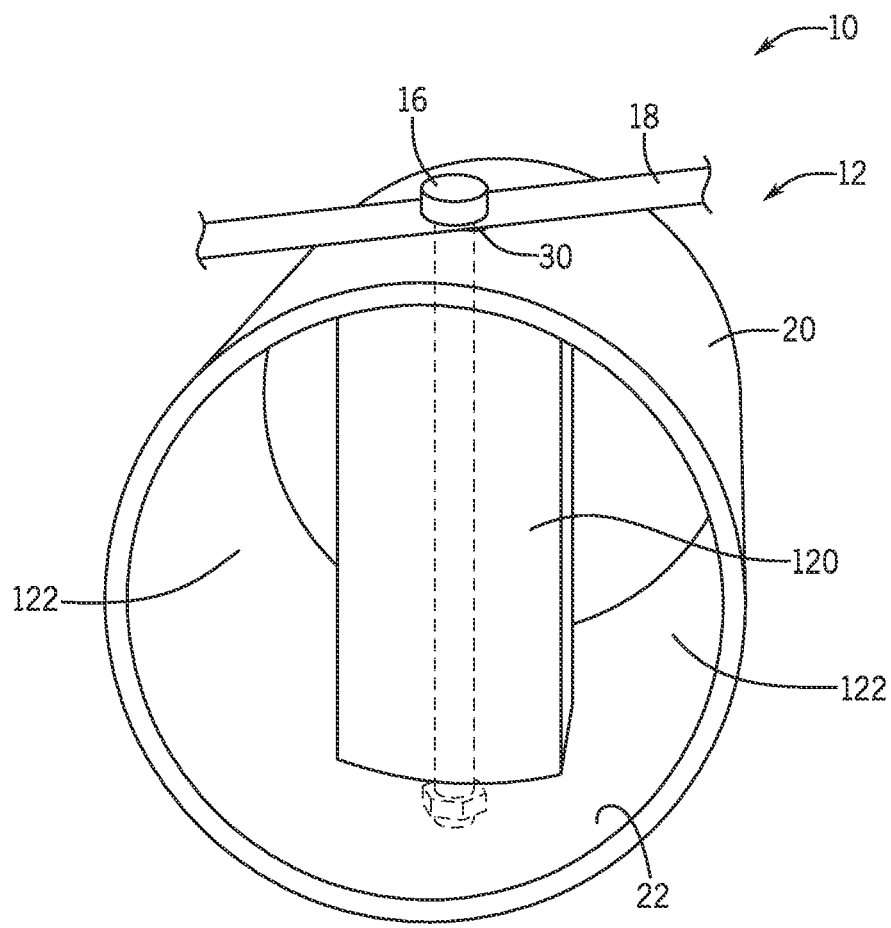
FIG. 7 is a perspective view of the hollow structural member of FIG. 1 with a columnar solid support, in accordance with an embodiment of the present disclosure.

FIG. 7 is a perspective view of an embodiment of the hollow structural member 12 with a columnar solid support 120 positioned in the interior space 22 of the hollow structural member 12. In FIG. 7, the columnar solid support 120 extends from one side of the interior space 22 to another side of the interior space 22. For example, the columnar solid support 120 extends from the hole 30 at a first side of the interior space 22 to a second side of the interior space 22, wherein the first side and the second side are diametrically opposed to one another. Thus, the columnar solid support 120 forms a column that contacts the first side and the second side to block compression or deformation of the first side toward the second side, for example. In this way, the columnar solid support 120 blocks compression or deformation of the first side toward the second side due to tightening of the fastener 16 of FIG. 1 when the fastener 16 is inserted through the hole 30. The columnar solid support 120 may provide other advantages, such as a lower weight than the solid support 14 of FIG. 1, as well as an option to maintain flow-by passages 122 for any fluid (e.g., air, liquid) to flow through the interior space 22. In certain cases with the flow-by passages 122, the columnar solid support 120 may set to block or seal the hole 30 and/or an additional sealing element (e.g., polymer, such as silicone) may be applied at the hole 30 to seal the hole 30.

The columnar solid support 120 may have any features of the solid support 14 described herein with respect to FIGS. 1-6, such as materials. Further, the columnar solid support 120 may be formed via same or similar techniques described herein with respect to FIGS. 1-6. For example, the bladder 40 of FIGS. 3-5 may be selected to have a columnar shape when in the inflated configuration. Thus, when the compound fills and sets within the bladder 40, the compound may form the columnar solid support 120. Further, the fastener 16 may be inserted into the hole 30 to secure the additional structural member 18 to the hollow structural member 12, and the fastener 16 may extend into the columnar solid support 120 to provide additional support to the fastener 16 and the structure 10 as well.

Figure 8:
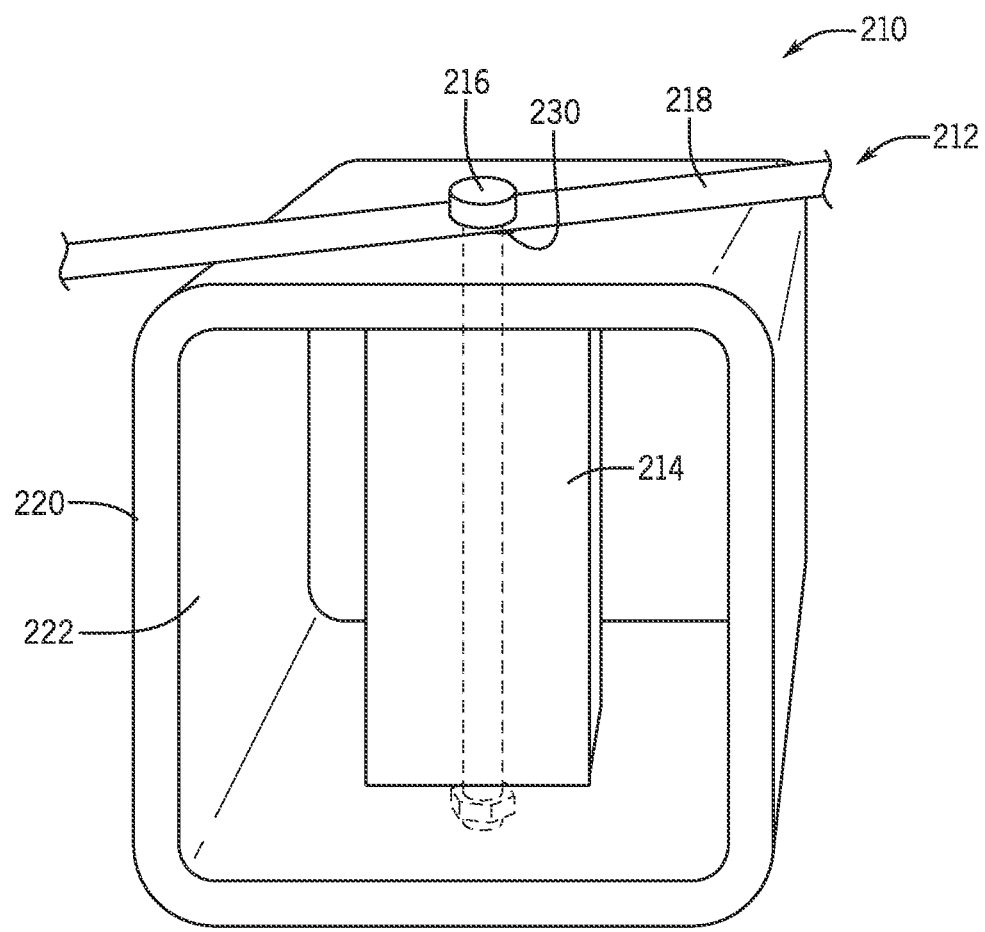
FIG. 8 is a perspective view of a portion of a structure that includes a hollow structural member with a square cross-sectional shape and with a columnar solid support, in accordance with an embodiment of the present disclosure.

FIG. 8 is a perspective view of an embodiment of a portion of a structure 210 that includes a hollow structural member 212 with a square cross-sectional shape and with a columnar solid support 214. As shown, a fastener 216 is provided to couple an additional structural member 218 to the hollow structural member 212.

It should be appreciated that the structure 210 may be at least a portion of a vehicle, building, bridge, show set, stage set, ride vehicle, ride track, display frame, portable device, portable prop, or any other suitable structure. The hollow structural member 212 may be a pipe or tube. In particular, the hollow structural member 212 may include a wall 220 (e.g., side wall; annular wall) that defines and/or surrounds an interior space 222 (e.g., center bore, passage, channel). The hollow structural member 212 is a substantially rigid member that may be made from metal (e.g., metal, metal alloy), concrete, or any other suitable material. While the hollow structural member 212 and the interior space 222 are depicted as having a square cross-sectional shape (e.g., taken in a plane perpendicular to a center axis) in FIG. 8, it should be appreciated that the hollow structural member 212 and the interior space 222 may have any suitable cross-sectional shape, such as a rectangular cross-sectional shape, for example The solid support 214 may provide support to the wall 220 from within the interior space 222 of the hollow structural member 212, which may block deformation of the wall 220. For example, the solid support 214 may block deformation of the wall 220 due to tightening the fastener 216 to couple to the hollow structural member 212 to the additional structural member 218. It should be appreciated that the solid support 214 may have any characteristics of the solid support 14 of FIG. 1 described herein, the fastener 216 may have any characteristics of the fastener 16 of FIG. 1 described herein, and the additional structural member 218 may have any characteristics of the additional structural member 18 of FIG. 1 described herein. Indeed, any features or aspects shown or described herein (e.g., a hole 230 with any characteristics of the hole 30 of FIG. 2) may be incorporated into the structure 210 of FIG. 8. Further, the solid support 214 may be formed via techniques described herein (e.g., a bladder with any characteristics of the bladder 40 of FIGS. 3-5), and the solid support 214 may have any suitable shape (e.g., non-columnar, such as square to extend across an entirety of the square cross-sectional shape to contact the wall 220 of the hollow structural member 212).

Structural support systems and related methods described herein may be utilized in any suitable structure and in any suitable context. As one example, the structural support systems and related methods described herein may be particularly useful in an entertainment venue, such as in an amusement park. The amusement park may include various attractions, such as show performances, ride attractions, interactive experiences, and so forth. The various attractions may include structures, such as show sets, stage sets, ride vehicles, ride tracks, display frames, portable devices, portable props, and so forth. In many cases, it may be desirable for the structures to be both lightweight and stable.

While only certain features of the invention have been illustrated and described herein, many modifications and changes will occur to those skilled in the art. It is, therefore, to be understood that the appended claims are intended to cover all such modifications and changes as fall within the true spirit of the invention. Indeed, any features shown in FIGS. 1-8 or described with reference to FIGS. 1-8 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A support system, comprising:
   a hollow structural member, comprising:
      a wall that defines an interior space; and
      an opening through the wall;
   a bladder configured to be positioned in the interior space via the opening, the bladder comprising:
      a membrane that encloses an internal volume; and
      a spout comprising at least one inlet to enable a compound to fill the internal volume to extend across the interior space of the hollow structural member to provide support to the hollow structural member, wherein the compound is configured to transition from a flowable material to a solid material to provide the support to the hollow structural member; and
   a fastener configured to insert through the opening to couple the hollow structural member to an additional structural member.

2. The support system of claim 1, wherein the compound comprises a gel, a resin, a cement, or any combination thereof.

3. The support system of claim 1, wherein the membrane is configured to dissolve over time.

4. The support system of claim 3, wherein the membrane is configured to dissolve due to exposure to components provided with the compound into the internal volume.

5. The support system of claim 1, wherein the hollow structural member is substantially rigid and the bladder is substantially flexible.

6. The support system of claim 1, wherein the fastener is configured to insert into or through a solid support formed by the compound.

7. The support system of claim 1, wherein the spout comprises:
   a first opening to provide an inlet for a fluid, an outlet for the fluid, or both; and
   a second opening to provide an additional inlet for the compound.

8. The support system of claim 1, comprising a controller configured to:
receive sensor data indicative of a volumetric flow of a fluid into the internal volume;
determine an appropriate amount of the compound to fill the internal volume based on the sensor data; and
control a compound pump system to provide the appropriate amount of the compound to fill the internal volume.

9. The support system of claim 1, wherein the compound forms a columnar solid support that extends across the interior space of the hollow structural member to provide the support to the hollow structural member.

10. The support system of claim 1, wherein the hollow structural member comprises a support structure for a vehicle, a building, a bridge, a show set, a stage set, a ride vehicle, a ride track, a display frame, a portable device, a portable prop, or any combination thereof.

11. The support system of claim 1, wherein the compound is configured to transition from the flowable material to the solid material within the membrane to provide the support to the hollow structural member.

12. A method of operating a support system, the method comprising:
disposing a compound within an internal volume enclosed by a membrane that is positioned in an interior space of a hollow structural member;
enabling the compound to transition from a flowable material to a solid material to form a solid support across the interior space of the hollow structural member; and
inserting a fastener through an opening formed in a wall that defines the interior space of the hollow structural member and into or through the solid support to couple the hollow structural member to another structural member.

13. The method of claim 12, comprising dissolving the membrane to enable the solid support to contact the wall that defines the interior space of the hollow structural member.

14. The method of claim 12, comprising:
receiving, at a controller, sensor data indicative of a volumetric flow of a fluid into the internal volume;
determining, using the controller, an appropriate amount of the compound to fill the internal volume based on the sensor data; and
controlling, using the controller, a compound pump system to provide the appropriate amount of the compound to fill the internal volume.

15. The method of claim 12, comprising:
prior to providing the compound to the internal volume that is enclosed by the membrane, providing a fluid to the internal volume enclosed by the membrane that is positioned in the interior space of the hollow structural member.

16. The method of claim 15, comprising:
providing the fluid to the internal volume enclosed by the membrane via a first opening of a spout that extends to the internal volume; and
evacuating the fluid from the internal volume enclosed by the membrane via the first opening of the spout while providing the compound to the internal volume enclosed by the membrane via a second opening of the spout that extends to the internal volume.

17. A method of operating a support system, the method comprising:
setting a compound within a bladder positioned in an interior space of a hollow structural member to form a solid support across the hollow structural member, wherein setting the compound comprises transitioning the compound from a flowable material to a solid material to form the solid support across the hollow structural member; and
inserting a fastener through an opening formed in a wall that defines the interior space of the hollow structural member and into or through the solid support to couple the hollow structural member to another structural member.

* * * * *